United States Patent
Van Den Heuvel et al.

(10) Patent No.: US 9,150,724 B2
(45) Date of Patent: Oct. 6, 2015

(54) POLYMER COMPOSITION CONTAINING A THERMOPLASTIC POLYESTER ELASTOMER

(71) Applicant: DSM IP ASSETS B.V., Heerlen (NL)

(72) Inventors: Paul Willem Jan Van Den Heuvel, Echt (NL); Pieter Gijsman, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/346,217

(22) PCT Filed: Sep. 19, 2012

(86) PCT No.: PCT/EP2012/068403
§ 371 (c)(1),
(2) Date: Mar. 20, 2014

(87) PCT Pub. No.: WO2013/041552
PCT Pub. Date: Mar. 28, 2013

(65) Prior Publication Data
US 2014/0228508 A1  Aug. 14, 2014

(30) Foreign Application Priority Data
Sep. 23, 2011  (EP) ..................... 11182466

(51) Int. Cl.
*C08L 67/08* (2006.01)
*C08K 5/3475* (2006.01)
*C08K 5/00* (2006.01)
*C08K 5/3492* (2006.01)

(52) U.S. Cl.
CPC ................. *C08L 67/08* (2013.01); *C08K 5/005* (2013.01); *C08K 5/3475* (2013.01); *C08K 5/34926* (2013.01)

(58) Field of Classification Search
None
See application file for complete search history.

(56) References Cited

U.S. PATENT DOCUMENTS 6,670,429 B2 * 12/2003 Appelman et al. ......... 525/444.5
2011/0274905 A1 * 11/2011 Tijssen et al. ............... 428/220

FOREIGN PATENT DOCUMENTS

EP   1839836 A1 * 10/2007
WO   WO 02/02667   1/2002
WO   WO 2006/048927  5/2006

OTHER PUBLICATIONS

International Search Report for PCT/EP2012/068403 mailed Nov. 28, 2012.

* cited by examiner

*Primary Examiner* — Vu A Nguyen
(74) *Attorney, Agent, or Firm* — Nixon & Vanderhye P.C.

(57) ABSTRACT

Polymer composition containing a thermoplastic polyester elastomer, which contains hard segments of a polyester and soft segments, that contain monomer units of a dimerized fatty acid and/or a derivative thereof, which polymer composition contains at least 0.1 wt % of a UV-absorber.

9 Claims, No Drawings

POLYMER COMPOSITION CONTAINING A THERMOPLASTIC POLYESTER ELASTOMER

This application is the U.S. national phase of International Application No. PCT/EP2012/068403 filed 19 Sep. 2012 which designated the U.S. and claims priority to EP 11182466.0 filed 23 Sep. 2011, the entire contents of each of which are hereby incorporated by reference.

Polymer compositions comprising a thermoplastic polyester elastomer are known for a long tome and are for instance described in Handbook of thermoplastic elastomers, $2^{nd}$ ed. Van Nostrand Reinhold, New York, ISBN 0-442-29184-1, p. 181-223.

The thermoplastic polyester elastomers, which contain hard segments of a polyester and a variety of soft segments, for example soft segments of a polyether, a polyester or a polycarbonate have an unusual combination of strength, elasticity and dynamic properties. Therefore they have found a use in all kind of applications, for instance automotive parts, like constant velocity drive joint boots, but also as heavy load spring members for trains or as insulation layer for wire and cables. The thermoplastic polyester elastomers however have a limited resistance to UV radiation. Therefore they have not found wide acceptance in outdoor applications. Although the thermoplastic elastomers are used in films for building applications, many of these films are used indoor. If the films are used as part of the roof construction under the tiles, it is necessary to place the tiles soon after the film has been placed, to protect the film from exposure to the sun.

For many applications it is desirable if the polymer composition comprising the thermoplastic polyester elastomer would have an increased UV-resistance. This would open new markets for the thermoplastic elastomers, because the products would become suitable for outdoor applications.

It is true that the thermoplastic elastomers containing hard segments of a polyester and soft segments that contain monomer units of a dimerised fatty acid and/or a derivative thereof have some retention of gloss after exposure to UV radiation. The mechanical properties however, like for the other thermoplastic elastomers containing hard segments of a polyester show a rapid decline after exposure to UV radiation.

Object of the present invention is to provide a polymer composition containing a thermoplastic elastomer that shows increased resistance to UV radiation.

Surprisingly this object is obtained by providing a polymer composition containing a thermoplastic elastomer, which contains hard segments of a polyester and soft segments, that contain monomer units of a dimerised fatty acid and/or a derivative thereof, which polymer composition contains at least 0.1 wt % of a UV-absorber. This result is very surprising, since the thermoplastic polyester elastomers normally do not only have a low UV-resistance but also the effect of a UV-absorber on the UV-resistance of these polymers is less pronounced than the effect of other additives used for improving UV-resistance. Surprisingly by both the use of the UV-absorber in combination with the use of the specific soft block of the thermoplastic polyester a remarkable increase in UV-resistance is obtained, especially with respect to retention of mechanical properties.

The dimerised fatty acids may be obtained from monomeric unsaturated fatty acids by an oligomerisation reaction. The oligomer mixture is further processed, for example by distillation, to yield a mixture having a high content of the dimerised fatty acid. The double bonds in the dimerised fatty acid may be saturated by catalytic hydrogenation. The term dimerised fatty acid as it is used here relates to both types of these dimerised fatty acids, the saturated and the unsaturated. It is preferred that the dimerised fatty acid is saturated.

It is also possible to produce derivatives of the dimerised fatty acid. For example a dimerised fatty diol may be obtained as a derivative of the dimerised fatty acid by hydrogenation of the carboxylic acid groups of the dimerised fatty acid, or of an ester group made thereof. Further derivatives may be obtained by converting the carboxylic acid groups, or the ester groups made thereof, into an amide group, a nitril group, an amine group or an isocyanate group.

The dimerised fatty acids may contain from 32 up to 44 carbon atoms. Preferably the dimerised fatty acid contains 36 carbon atoms.

Further details relating to the structure and the properties of the dimerised fatty acids may be found in the corresponding leaflet "Pripol C36-Dimer acid" of the company UNICHEMA (Emmerich, Germany) or in the brochure of the Company COGNIS (Düsseldorf, Germany) "Empol Dimer and Poly-basic Acids; Technical Bulletin 114C (1997)".

In the production of the thermoplastic elastomer containing the monomer unit of the dimerised fatty acid and/or a derivative thereof the dimerised fatty acid and its derivative may be used as a monomer or as a pre-cursor oligomer or polymer. In one example the pre-cursor oligomer or polymer is a polyester, formed of dimerised fatty acid and/or dimerised fatty diol with any combination of diols or dicarboxylic acids. In another example the pre-cursor oligomer or polymer is a polyamide, formed of dimerised fatty acid and/or dimerised fatty diamines with any combination of diamines or dicarboxylic acids forming polyamides.

It is also possible that the pre-cursor is a precursor oligomer or polymer of a dimerised fatty acid and a dimerised fatty amine. Depending on the ratio of dimerised fatty acids and dimerised fatty amines as well as the degree of polymerization of the fatty acid and the fatty amine the endgoups of the precursor may be tuned to be acid groups.

The precursor oligomer or polymer preferably has a number average molecular weight (Mn) of at least 600 kg/kmol, more preferably at least 1000 kg/kmol, even more preferably at least 2000 kg/kmol. The Mn is preferably at most 5000 kg/kmol, more preferably at most 2500 kg·kmol.

The polymer may contain between 1 and 70 wt. % of the monomer units of the dimerised fatty acid and/or a derivative thereof. Preferably the polymer contains between 20 and 60, more preferably between 30 and 55 wt. % of the monomer units of the dimerised fatty acid and/or a derivative thereof.

The thermoplastic elastomer suitably contains hard segments of a polyester that are built up from repeating units derived from at least one alkylene diol and at least one aromatic dicarboxylic acid or an ester thereof. The linear or cycloaliphatic alkylene diol contains generally 2-8 C-atoms, preferably 2-4 C-atoms. Examples thereof include ethylene glycol, propylene diol and butylene diol. Preferably propylene diol or butylene diol are used, more preferably 1,4-butylene diol. Examples of suitable aromatic dicarboxylic acids include terephthalic acid, 2,6-naphthalenedicarboxylic acid, 4,4'-biphenyldicarboxylic acid or combinations of these. The advantage thereof is that the resulting polyester is generally semi-crystalline with a melting point of above 150, preferably above 175, and more preferably of above 190° C. The hard segments may optionally further contain a minor amount of units derived from other dicarboxylic acids, for example isophthalic acid, which generally lowers the melting point of the polyester. The amount of other dicarboxylic acids is preferably limited to not more than 10, more preferably not more than 5 mol %, based on the total amount of dicarboxylic acids, so as to ensure that, among other things, the crystallization behaviour of the copolyether ester is not adversely affected. The hard segment is preferably built up from ethylene terephthalate, propylene terephtalate, and in particular from butylene terephthalate as repeating units. Advantages of these readily available units include favourable crystallisation behaviour and a high melting point, resulting in a thermoplastic elastomer according to the invention with good processing properties, excellent thermal and chemical resistance and good puncture resistance.

A UV-absorber is a compound that absorbs UV-light and transforms it into for the polymer less harmful energy.

Examples of UV-absorbers are pigments. Like for example carbon black, titanium dioxide, zinc oxide and organic chemical compounds, like for example hydoxybenzophenones, hydroxybenzotriazoles, triazines, anilides, benzoates, cyanoacrylates and phenylformamidines.

Examples of hydoxybenzophenones include 2-hydroxy-4-n-octoxybenzophenone, 2-hydroxy-4-methoxybenzophenone, 2-propenoic acid, 2-(4-benzoyl-3-hydroxyphenoxy) ethyl ester, 2-hydroxy-4-n-dodecyloxy-benzophenone Poly-4-(2-acryloyloxyethoxy)-2-hydroxybenzophenone, bis-(2-methoxy-4-hydroxy-5-benzoyl-phenyl)-methane and [2-hydroxy-4-(2-hydroxyethoxy)phenyl]phenyl-methanone.

Examples of hydroxybenzotriazoles include 2-(2'-Hydroxy-3',5'-di-t-butyl-phenyl)-benzotriazole, 2-(2''-hydroxy-3''-t-butyl-5''-methylphenyl)-5-chlorobenzotriazole, 2-(5-chloro-2H-benzotriazol-2-yl)-4,6-bis-(1,1-dimethylethyl)-phenol, 2-(2''-hydroxy-3,5''-di-t-amylphenyl)benzotriazole, 2-(2H-benzotriazol-2-yl)-4-methyl-phenol, 2-(2H-benzotriazol-2-yl)-4-(1,1-dimethylethyl)-phenol, 2-(2H-benzotriazol-2-yl)-4-(1,1,3,3-tetramethylbutyl)-phenol, 3-(2H-benzotriazole-2-yl)-5-(1,1-dimethylethyl)-4-hydroxy-1,6-hexanediylester of benzene propanoic acid, bis[2-hydroxy-5-t-octyl-3-(benzotriazol-2-yl)phenyl]methane, 2-[2-hydroxy-3,5-di(1,1-dimethylbenzyl)phenyl]2H-benzotriazole, bis[2-hydroxy-5-methyl-3-(benzotriazol-2-yl)phenyl]nethane, 2-(2H-benzotriazol-2-yl)-4-(1,1-dimethylethyl)-6-(2-methylpropyl)-phenol, 2-(2H-benzotriazole-2-yl)-4-methyl-6-dodecyl phenol, reaction product of β-[-3-(2-H-Benzotriazol-2-yl)-4-hydroxy-5-tert.butylphenyl]-propionic acid-methyl ester and polyethyleneglycol 300, 3-(2H-benzotriazol-2-yl)-5-(1,1-dimethylethyl)-4-hydroxy-benzenepropanoic acid, 2-(2H-benzotriazol-2-yl)-6-(1 methyl-1 phenylethyl)4-(1,1,3,3-tetramethylbutyl)phenol, 2-(2'-hydroxy-5'-(2-hydroxyethyl))-benzotriazole, 2-(2-hydroxy-4-octyloxyphenyl)-2H-benzotriazole, 2-[4-[4,6-bis([1,1'-biphenyl]-4-yl)-1,3,5-triazin-2-yl]-3-hydroxyphenoxy]-propanoic acid isooctyl ester, octyl-3-[3-tert-butyl-4-hydroxy-5-(5-chloro-2H-benzotriazole-2-yl)fenyl] propionaat+2-, ethylhexyl-3-[3-tertbutyl-4-hydroxy-5-(5-chloro-2H-benzotriazole-2yl)fenyl]propionaat and 2-(2H-benzotriazol-2-yl)-6-[[3-(1,1-dimethylethyl)-2-hydroxy-5-methylphenyl]methyl]-4-(1,1,3,3-tetramethylbutyl)-phenol.

Examples of triazines include 2-[4,6-diphenyl-1,3,5-triazin-2-yl]-5-(hexyl)oxy-phenol, 2-[4,6-bis(2,4-dimethylphenyl)-1,3,5-triazin-2-yl]-5-(octyloxy)-phenol, 2-[4-[(2-hydroxy-3-(2'-ethyphexyl)oxy]-2-hydroxyphenyl]-4,6-bis (2,4-dimethylphenyl)-1,3,5-triazine, 2,4-bis[2-hydroxy-4-butoxyphenyl]-6-(2,4-dibutoxyphenyl)-1,3,5-triazine, 5,5'-bis(2-ethylhexyloxy)-2,2'-[6-(4-methoxyphenyl)-1,3,5-triazine-2,4-diyl]diphenol and a mixture of: 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine in 1-methoxy-2-propylacetate, Examples of anilides include 2-ethoxy-5-t-butyl-2'-ethyl-oxalanilide, 2-ethyl, 2'-ethoxy-oxalanilide and N-(2-ethoxyphenyl)-N'-(4-iso-dodecyl-phenyl)ethanediamine.

Examples of benzoates include 3,5-di-t-butyl-4-hydroxybenzoic acid, n-hexadecyl ester, 4-t-butyl-phenyl-salicylate, benzoic acid, 3,5-bis(1,1-dimethylethyl)-4-hydroxy-,2,4-bis(1,1-dimethylethyl)phenyl ester and benzoic acid, 2-hydroxy-, phenyl ester.

Examples of cyanoacrylates include ethyl 2-cyano-3,3-diphenylacrylate 2-Ethylhexyl 2-cyano-3,3-diphenylacrylate and 1,3-bis-[2'-cyano-3',3-diphenylacryloyl)oxy]-2,2-bis-{[2-cyano-3',3'-diphenylacryloyl)oxy]methyl}propane.

Examples of phenylformamidines include the ethyl ester of 4-[[(methylphenylamino)methylene]amino]-benzoic acid and N-(ρ-Ethoxy-carbonylphenyl)-N'-ethyl-N'-phenylformamidine.

Further examples of UV-absorbers include 3-(4-methoxyphenyl)-, 2-ethylhexyl ester of 2-propenoic acid, [(4-methoxyphenyl)-methylene]-dimethyl ester of Propanedioic acid, tetra-ethyl-2,2'-(1,4-phenylene-dimethylidene)-bismalonate, 1,4-bis(4-benzoyl-3-hydroxyphenoxy)-butane and 2.2'-(1,4-phenylene)bis[4H-3,1-benzoxazin-4-one].

Preferably the organic chemical compounds are used, since these have a very good effect on the retention of the mechanical properties after exposure by UV radiation and they don't give a color to the polymer.

The amount of absorbers used is at least 0.1 weight % of the polymer composition, preferably at least 0.2 wt. %, more preferably at least 0.4 wt. %. Preferably the amount of absorber is less than 5 wt. %, more preferably less than 2 wt. %.

The composition according to the invention preferably contains next to the UV-absorber a Hindered Amine Light Stabilizer (HALS).

Preferably the amount of HALS used in the polymer composition according to the invention is between 0.1 and 2 wt. % of the polymer composition.

Preferably, the HALS chosen is a compound derived from a substituted piperidine compound, in particular any compound which is derived from an alkyl-substituted piperidyl, piperidinyl or piperazinone compound or a substituted alkoxypiperidinyl compound.

Examples of such compounds are:
2,2,6,6-tetramethyl-4-piperidone; 2,2,6,6-tetramethyl-4-piperidinol; bis-(1,2,2,6,6-pentamethylpiperidyl)-(3',5'-di-tert-butyl-4'- hydroxybenzyl)butylmalonate; di-(2,2,6,6-tetramethyl-4-piperidyl) sebacate (Tinuvin® 770); oligomer of N-(2-hydroxyethyl)-2,2,6,6-tetramethyl-4-piperidinol and succinic acid (Tinuvin® 622); bis-(2,2,6,6-tetramethyl-4-piperidinyl) succinate; bis-(1-octyloxy-2,2,6,6-tetramethyl-4-piperidinyl) sebacate (Tinuvin® 123); bis-(1,2,2,6,6-pentamethyl-4-piperidinyl) sebacate (Tinuvin® 765); N,N'-bis-(2,2,6,6-tetramethyl-4-piperidyl) hexane-1,6-diamine (Chimassorb® T5); N-butyl-2,2,6,6-tetramethyl-4-piperidinamine; 2,2'[(2,2,6,6-tetramethylpiperidinyl)imino]-bis-[ethanol]; poly((6-morpholine-S-triazine-2,4-diyl)(2,2,6,6-tetramethyl-4-piperidinyl)-iminohexamethylene-(2,2,6,6-tetramethyl-4-piperidinyl)-imino) (Cyasorb® UV 3346); 5-(2,2,6,6-tetramethyl-4-piperidinyl)-2-cyclo-undecyloxazole) (Hostavin® N20); 8-acetyl-3-dodecyl-7,7,9,9-tetramethyl-1,3,8-triaza-spiro(4,5)decane-2,4-dione; polymethylpropyl-3-oxy[4(2,2,6,6-tetramethyl)-piperidinyl)siloxane (Uvasil® 299); copolymer of α-methylstyrene-N-(2,2,6,6-tetramethyl-4-piperidinyl)maleimide and N-stearylmaleimide; 1,2,3,4-butanetetracarboxylic acid, polymer with beta, beta, beta',beta'-tetramethyl-2,4,8,10-tetraoxaspiro[5.5]undecane-3,9-diethanol, 1,2,2,6,6-pentamethyl-4-piperidinyl ester (Mark® LA63); 2,4,8,10-tetraoxaspiro[5.5]undecane-3,9-diethanol,beta,beta,beta',beta'-tetramethyl-, polymer with 1,2,3,4-butanetetracarboxylic acid, 2,2,6,6-tetramethyl-4-piperidinyl ester (Mark® LA68); D-glucitol, 1,3:2,4-bis-O-(2,2,6,6-tetramethyl-4-piperidinylidene)-(HALS 7); oligomer of 7-oxa-3,20-diazadispiro[5.1.11.2]heneicosan-21-one,2,2,4,4-tetramethyl-20-(oxiranylmethyl) (Hostavin® N30); propanedioic acid, [(4-methoxyphenyl)methylene]-, bis(1,2,2,6,6-pentamethyl-4-piperidinyl) ester (Sanduvor® PR 31); formamide, N,N'-1,6-hexanediylbis[N-(2,2,6,6-tetramethyl-4-piperidinyl (Uvinul® 4050H). 1,3,5-triazine-2,4,6-triamine, N,N'''-1,2-ethanediylbis[[[4,6-bis[butyl(1,2,2,6,6-pentamethyl-4-iperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119); 1,5-dioxaspiro(5,5) undecane 3,3-dicarboxylic acid, bis (2,2,6,6-tetramethyl-4-peridinyl) ester (Cyasorb® UV-500); 1,5-dioxaspiro(5,5) undecane 3,3-dicarboxylic acid, bis (1,2,2,6,6-pentamethyl-4-peridinyl) ester (Cyasorb® UV-516); N-2,2,6,6-tetramethyl-4-piperidinyl-N-amino-oxamide; 4-acryloyloxy-1,2,2,6,6-pentamethyl-4-piperidine; HALS PB-41 (Clariant Huningue S.A.); 1,3-benzendicarboxamide, N,N'-bis(2,2,6,6-tetramethyl-4-piperidinyl) (Nylostab® S-EED (Clariant Huningue S.A.)); 3-dodecyl-1-(2,2,6,6-tetramethyl-4-piperidyl)-pyrrolidin-2,5-dione; 1,3-Propanediamine, N,N-1,2-ethanediylbis-, polymer with 2,4,6-trichloro-1,3,5-triazine, reaction products with N-butyl-2,2,6,6-tetramethyl-4-piperidinamine (Uvasorb® HA88); 1,1'-(1,2-ethane-di-yl)-bis-(3,3',5,5'-tetra-methyl-piperazinone) (Good-rite® 3034); 1,1',1''-(1,3,5-triazine-2,4,6-triyltris((cyclohexylimino)-2,1-ethanediyl)tris(3,3,5,5-tetramethylpiperazinone); (Good-rite® 3150); 1,1',1''-(1,3,5-triazine-2,4,6-triyltris((cyclohexylimino)-2,1-ethanediyl)tris(3,3,4,5,5-tetramethylpiperazinone) (Good-rite® 3159); 1,2,3,4-Butanetetracarboxylic acid, tetrakis(2,2,6,6-tetramethyl-4-piperidinyl) ester (ADK STAB® LA-57) 1,2,3,4-Butane-tetra-carboxyllc acid, 1,2,3-tris-(1,2,2,6,6-penta-methyl-4-piperidyl)-4-tridecylester (ADK STAB® LA-62).

Mixture of esters of 2,2,6,6-tetra-methyl-4-pipiridinol and several fatty acid (CYASORB® UV3853); Propanedioic acid, [(4-methoxyphenyl)methylene]-,bis(2,2,6,6-tetramethyl-4-piperidinyl) ester (HOSTAVIN® PR-31); 3-Dodecyl-1-(2,2,6,6-tetramethyl-4-piperidyl)-pyrrolidin-2,5-dione (CYASORB® UV3581); 3-Dodecyl-1-(1,2,2,6,6-pentamethyl-4-piperidyl)-pyrrolidin-2,5-dione (CYASORB® UV3641); 1,2,3,4-Butanetetracarboxylic acid, tetrakis(1,2,2,6,6-pentamethyl-4-piperidinyl)ester (ADK STAB® LA-52); 1,2,3,4-Butane-tetra-carboxylic acid, 1,2,3-tris-(2,2,6,6-tetra-methyl-4-piperidyl)-4-tridecylester (ADK STAB® LA-67); Mixture of: 2,2,4,4 tetramethyl-21-oxo-7-oxa-3.20-diazadispiro[5.1.11.2]-heneicosane-20-propionic acid dodecylester and 2,2,4,4 tetramethyl-21-oxo-7-oxa-3.20-diazadispiro[5.1.11.2]-heneicosane-20-propionicacid tetradecylester (Hostavin® N24); Poly[[6-[(1,1,3,3-tetramethylbutyl)amino]-s-triazine-2,4-diyl][2,2,6,6-tetramethyl-4-piperidinyl)-imino]hexamethylene[(2,2,6,6-tetramethyl-4-piperidinyl)imino]]} (Chimassorb® 944); 1,3,5-Triazine-2,4,6-triamine, N,N'''-[1,2-ethanediylbis[[[4,6-bis[butyl(1,2,2,6,6-pentamethyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl) (Chimassorb® 119); Poly[(6-morpholino-s-triazine-2,4-diyl)[1,2,2,6,6-penta-methyl-4-piperidypimino]-hexamethylene[(1,2,2,6,6 penta-methyl-4-piperidyl)imino]]1,6- Hexanediamine, N,N'-bis(1,2,2,6,6-pentamethyl-4-pipiridinyl)-, Polymers with morpholine-2,4,6-trichloro-1,3,5-triazine (CYASORB® UV3529); Poly-methoxypopyl-3-oxy[4(1,2,2,6,6-pentamethyl)-piperidinyl]-siloxane (Uvasil®816); 1,6-Hexanediamine, N,N'-bis(2,2,6,6-tetramethyl-4piperidinyl)-polymer with 2,4,6-trichloro-1,3,5-triazine, reaction products with N-butyl-1-butanamine and N-butyl-2,2,6,6-tetramethyl-4-piperidinamine (Chimassorb® 2020); Reaction products of N, N'-ethane-1,2-diylbis(1,3-propanediamine), cyclohexane, peroxidized 4-butylamino-2,2,6,6-tetramethylpiperidine and 2,4,6-trichloro-1,3,5-triazine (Flamestab NOR® 116); 1,6-hexanediamine, N,N'-bis(2,2,6,6-tetramethyl 4-piperidinyl)-, polymer with 2,4,6-trichloro-1,3,5-triazine, reaction products with 3-bromo-1-propene, n-butyl-1-butanamine a nd N-butyl-2,2,6,6-tetramethyl-4-piperidinamine, oxidised, hydrogenated (Tinuvin NOR® 371).

The invention also relates to a film suitable for use in buildings, comprising at least one layer of the composition according to the invention.

The invention will further be explained by the examples, without being restricted thereto.

Materials Used

Arnitel™ ECO, delivered by DSM, containing hard segments of polybutylene terephthalate and 30 wt. % of soft segments of dimerised fatty acid residues.

Tinuvin™ 234 (2-[2-hydroxy-3,5-di(1,1-dimethylbenzyl)phenyl]2H-benzotriazole), a UV-absorber delivered by BASF, Germany.

Chimasorb™ 944 (Poly[[6-[(1,1,3,3-tetramethylbutypamino]-s-triazine-2,4-diyl][2,2,6,6-tetramethyl-4-piperidinyl)-imino]hexamethylene[(2,2,6,6-tetramethyl-4-piperidinyl)imino]]}), a HALS deliverd by BASF, Germany.

UV-Resistance

The UV-resistance was determined with an Atlas Weather-Ometer Ci65(A) according to PV1303, using a Xenon arc with a radiation intensity of 1.20 W/m2/nm at 420 nm, with a black standard temperature of 100+/−3° C., a chamber temperature of 65+/−3° C. and a relative humidity of 20+/−10%.

Breaking Strength

The breaking strength was determined according to DIN 53504:2009-10 using an S3 tensile bar and a deformation rate of 50 mm/min.

Preparation of the Polymer Compositions

Dry blends of the composition are prepared in a tumble mixer. The dry blends are thereafter extruded on a Coperion™ co-rotating twin screw extruder and processed into granulate.

Preparation of Test Bars

Test bars for testing the breaking strength were produced by cutting DIN 53504 S3 tensile bars out of injection moulded plaques. The plaques were produced with an Arburg 110 Allround injection moulding machine. The melt temperature was approximately 240° C.

Example I and Comparative Experiments A and B

The type and amounts of additive used in the examples and comparative experiments as well as the results are given in table I. In Example I composition of the polymer and 0.5 wt. % of the absorber is used. In Comparative experiment A not any UV-absorber or UV stabilizer is used. In Comparative experiment B 0.5 wt. % of the HALS is used.

The strain at break was determined after 0, 150 and 350 hours of exposure. The retention of the strain at break is given in table 1 as percentage of the strain at break of the test sample before expose (0 hours)

From the results it is clear that the composition with the absorber shows a much better retention of the strain at break than the samples without the absorber. The retention of the strain at break is even better than that of the composition with the HALS.

TABLE 1

|  | Comp. Exp. A | Ex. I | Comp. Exp. B |
|---|---|---|---|
| % DFA | 30 | 30 | 30 |
| % Chimassorb 944 | 0 | 0.5 | 0 |
| % Tinuvin 234 | 0 | 0 | 0.5 |
| Retention strain at break 150 hr | 20% | 90% | 75% |
| Retention strain at break 350 hr. | 25% | 85% | 20% |

The invention claimed is:

1. A polymer composition comprising a thermoplastic polyester elastomer and at least 0.1 wt. % of a UV-absorber, wherein the thermoplastic polyester is comprised of hard segments of a polyester and soft segments, wherein the soft segments include monomer units of a dimerised fatty acid and/or a derivative thereof.

2. The polymer composition according to claim 1, wherein the composition comprises at least 0.2 wt. % of the UV-absorber.

3. The polymer composition according to claim 1, wherein the composition comprises at least 0.4 wt. % of the UV-absorber.

4. The polymer composition according to claim 1, wherein the UV-absorber is an organic chemical compound.

5. The polymer composition according to claim 1, wherein the composition contains at least 0.1 wt. % of a Hindered Amine Light Stabilizer (HALS).

6. The polymer composition according to claim 1, wherein the thermoplastic polyester elastomer comprises hard segments of polybutyleneterephthalate.

7. The polymer composition according to claim 1, wherein the thermoplastic polyester elastomer comprises a soft segment that includes monomer units of a dimerized fatty acid and/or a derivative thereof comprising 32-44 carbon atoms.

8. The polymer composition according to claim 1, wherein the thermoplastic polyester elastomer comprises a soft segment that includes monomer units of a dimerized fatty acid and/or a derivative thereof comprising 36 carbon atoms.

9. A film suitable for use in buildings, comprising at least one layer comprised of the composition according to claim 1.

* * * * *